(12) United States Patent
Ott et al.

(10) Patent No.: US 8,580,162 B2
(45) Date of Patent: Nov. 12, 2013

(54) METHOD OF DIRECTLY MOLDING FERRULE ON FIBER OPTIC CABLE

(75) Inventors: Michael James Ott, Le Sueur, MN (US); Thomas P. Huegerich, Manchester Center, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 451 days.

(21) Appl. No.: 12/725,626

(22) Filed: Mar. 17, 2010

(65) Prior Publication Data

US 2010/0301502 A1    Dec. 2, 2010

Related U.S. Application Data

(60) Provisional application No. 61/160,814, filed on Mar. 17, 2009.

(51) Int. Cl.
*B29D 11/00*    (2006.01)

(52) U.S. Cl.
USPC .............................. 264/1.25; 264/1.7; 264/2.7

(58) Field of Classification Search
USPC ............. 264/1.25, 1.28, 2.5, 1.1, 2.6, 1.7, 2.7
See application file for complete search history.

(56) References Cited

U.S. PATENT DOCUMENTS

| | | |
|---|---|---|
| 4,932,989 A | 6/1990 | Presby |
| 5,214,730 A | 5/1993 | Nagasawa et al. |
| 5,371,816 A | 12/1994 | Pan |
| 5,375,183 A | 12/1994 | Edwards et al. |
| 5,377,286 A | 12/1994 | Iida et al. |
| 5,519,799 A | 5/1996 | Murakami et al. |

(Continued)

FOREIGN PATENT DOCUMENTS

| | | |
|---|---|---|
| EP | 1 223 445 A1 | 7/2002 |
| JP | 3471460 | 9/2003 |
| JP | 2004-117616 | 4/2004 |

OTHER PUBLICATIONS

International Search Report and Written Opinion mailed Nov. 30, 2010.

(Continued)

*Primary Examiner* — Mathieu D. Vargot
(74) *Attorney, Agent, or Firm* — Merchant & Gould P.C.

(57) ABSTRACT

A method of directly molding a fiber optic ferrule on an end of a fiber optic cable is disclosed. The method preferably includes stripping a cable jacket and/or a buffer layer from optical fibers of the fiber optic cable and trimming the optical fibers with a laser thereby creating trimmed ends on the optical fibers. The optical fibers and preferably a pin assembly are held near the end of the fiber optic cable by an optical fiber and pin locator. The optical fiber and pin locator can statically or dynamically hold and position the optical fibers and pin assembly. After the optical fibers and/or the pin assembly are positioned, a fixture is attached to the trimmed ends of the optical fibers and/or the pin assembly thereby preserving their relative position to each other. After the fixture is attached, the optical fiber and pin locator is removed, and the end of the fiber optic cable with the attached fixture is placed into a mold cavity. A molding material is injected into the mold cavity thereby overmolding a substantial portion of the end of the fiber optic cable and thereby creating a molded body of the fiber optic ferrule. After molding, the fixture is removed. The fixture preferably includes a thin film that is hardened on the trimmed ends of the optical fibers while the optical fiber and pin locator is attached.

24 Claims, 9 Drawing Sheets

(56) References Cited

U.S. PATENT DOCUMENTS

| | | | |
|---|---|---|---|
| 5,548,675 A | 8/1996 | Shigematsu et al. |
| 5,712,939 A | 1/1998 | Shahid |
| 5,737,463 A | 4/1998 | Weiss et al. |
| 5,743,785 A | 4/1998 | Lundberg et al. |
| 5,786,002 A | 7/1998 | Dean et al. |
| 5,845,028 A | 12/1998 | Smith et al. |
| 5,855,503 A | 1/1999 | Csipkes et al. |
| 5,867,620 A | 2/1999 | Bunin et al. |
| 6,007,257 A | 12/1999 | Ogawa et al. |
| 6,106,368 A | 8/2000 | Childers et al. |
| 6,246,026 B1 | 6/2001 | Vergeest |
| 6,282,349 B1 | 8/2001 | Griffin |
| 6,328,479 B1 | 12/2001 | Schofield et al. |
| 6,331,081 B1 | 12/2001 | Ohtsuka et al. |
| 6,340,247 B1 | 1/2002 | Sakurai et al. |
| 6,347,890 B2 | 2/2002 | Ueno et al. |
| 6,352,372 B1 | 3/2002 | Shahid |
| 6,357,928 B1 | 3/2002 | Haley et al. |
| 6,416,236 B1 | 7/2002 | Childers et al. |
| 6,579,014 B2 | 6/2003 | Melton et al. |
| 6,628,886 B2 | 9/2003 | Sommer et al. |
| 6,648,520 B2 | 11/2003 | McDonald et al. |
| 6,769,811 B2 | 8/2004 | Hall et al. |
| 6,773,166 B2 | 8/2004 | Trezza et al. |
| 6,817,778 B2 | 11/2004 | Kang et al. |
| 6,825,440 B2 | 11/2004 | Ohta et al. |
| 6,848,870 B2 | 2/2005 | Grabbe et al. |
| 6,854,898 B2 | 2/2005 | Natori et al. |
| 6,899,465 B2 | 5/2005 | Trezza et al. |
| 6,899,467 B2 | 5/2005 | McDonald et al. |
| 6,913,397 B2 | 7/2005 | Kang et al. |
| 6,945,706 B2 | 9/2005 | Gimbel et al. |
| 6,957,920 B2 | 10/2005 | Luther et al. |
| 6,963,687 B2 | 11/2005 | Vergeest et al. |
| 7,004,639 B2 | 2/2006 | Norland |
| 7,082,250 B2 | 7/2006 | Jones et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,197,224 B2 | 3/2007 | Rolston et al. |
| 7,216,512 B2 | 5/2007 | Danley et al. |
| 7,377,700 B2 | 5/2008 | Manning et al. |
| 7,393,142 B2 | 7/2008 | Dean, Jr. et al. |
| 7,527,435 B2 | 5/2009 | Dean, Jr. et al. |
| 2003/0026550 A1 | 2/2003 | Demangone |
| 2003/0063868 A1 | 4/2003 | Fentress |
| 2005/0180695 A1 | 8/2005 | Bronstein et al. |
| 2005/0180702 A1 | 8/2005 | Kevern et al. |
| 2005/0249465 A1 | 11/2005 | Kevern et al. |
| 2006/0137403 A1 | 6/2006 | Barr et al. |
| 2008/0067158 A1 | 3/2008 | Levesque |
| 2008/0210362 A1 | 9/2008 | Douglass et al. |
| 2008/0232744 A1 | 9/2008 | Dean et al. |

OTHER PUBLICATIONS

Comet™ System Description Laser-Based Fiber Optic Connector Cleaver, 5 pages (Date printed Jul. 20, 2009).

Comet™ World's First Commercially Available Non-Contact Laser-Based Fiber Optic Connector Cleaver, 2 pages (Date printed Jul. 20, 2009).

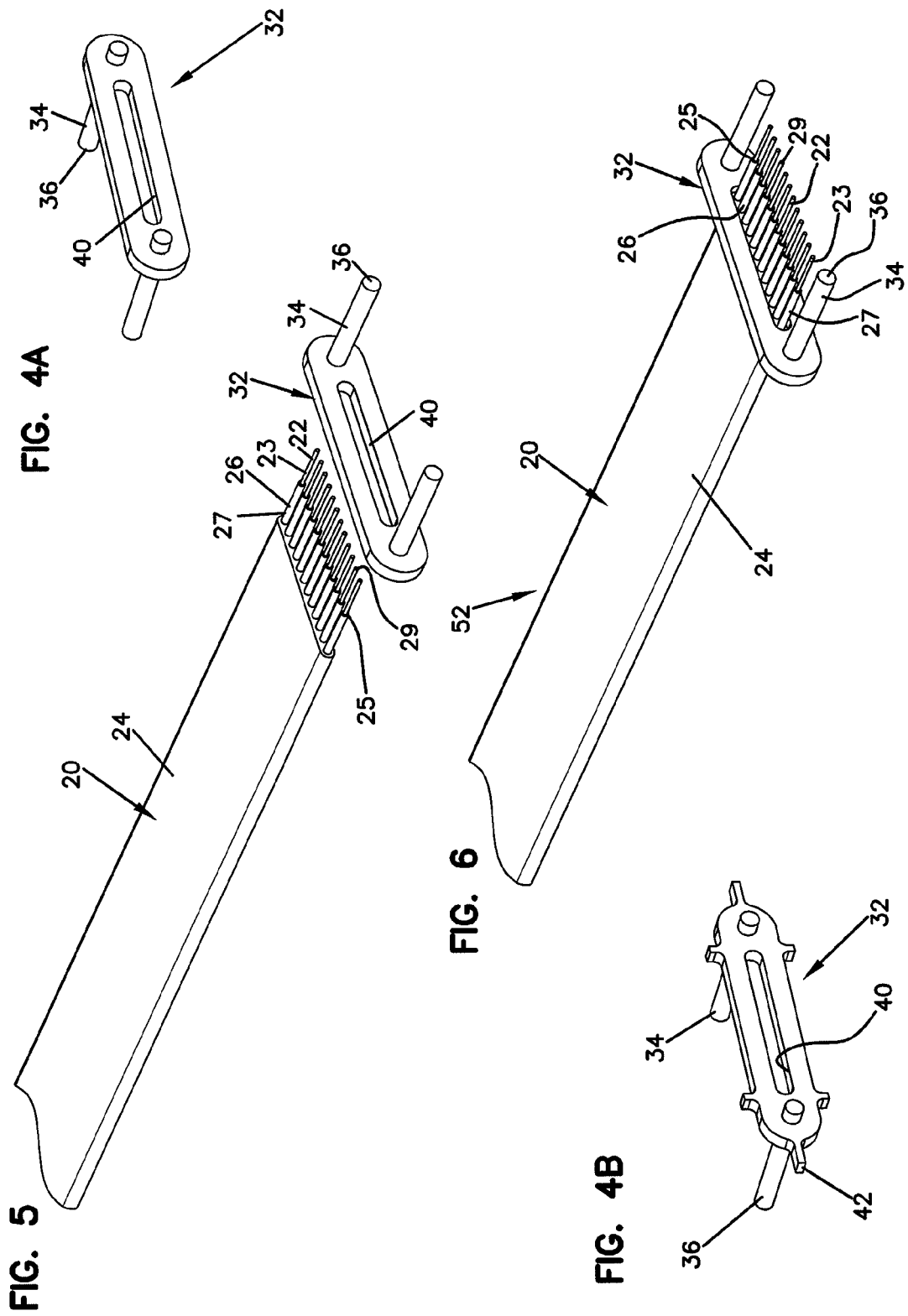

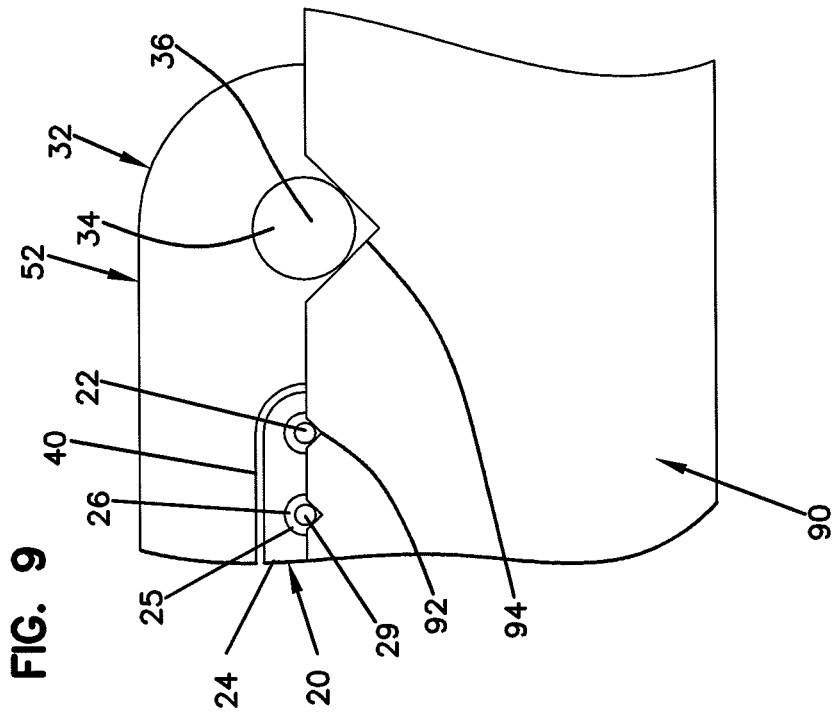
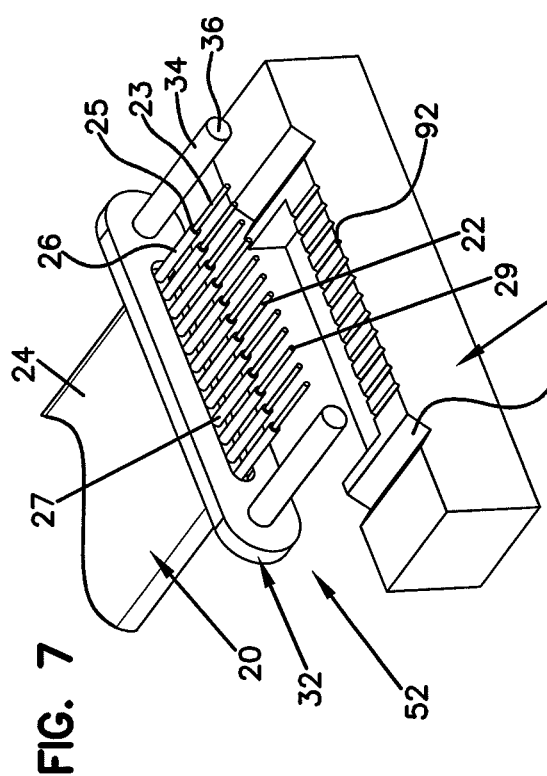
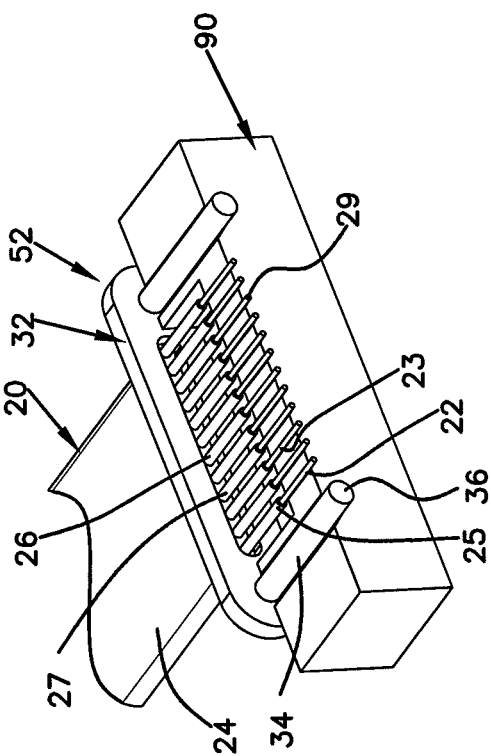

METHOD OF DIRECTLY MOLDING FERRULE ON FIBER OPTIC CABLE

CROSS-REFERENCE TO RELATED APPLICATION

The present application claims the benefit of U.S. Provisional Patent Application Ser. No. 61/160,814, filed Mar. 17, 2009, which application is hereby incorporated by reference in its entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at ends of the fiber optic cables. Fiber optic connectors generally include ferrules that support ends of the optical fibers of the fiber optic cables. End faces of the ferrules are typically polished and are often angled. For certain applications, fiber optic adapters can be used to align and/or mechanically couple two fiber optic connectors together. Fiber optic connectors can include ferrules supporting single optical fibers (i.e., single-fiber ferrules corresponding to single-fiber connectors) and can also include ferrules supporting multiple optical fibers (i.e., multiple-fiber ferrules corresponding to multiple-fiber connectors). Examples of existing single-fiber fiber optic connection systems are described at U.S. Pat. Nos. 7,090,406; 7,090,407; and 7,111,990. Examples of multi-fiber connection systems are disclosed at U.S. Pat. Nos. 5,214,730; 6,579,014; 6,648,520; and 6,899,467.

SUMMARY OF THE DISCLOSURE

The present disclosure relates to a ferrule molded over an end of an optical fiber of a fiber optic cable. In the present disclosure, ferrule is defined as a component in which an end of an optical fiber is secured to provide direct support to the optical fiber and to facilitate providing alignment between optical fibers desired to be optically coupled together. In a ferrule including multiple optical fibers, such a ferrule can provide relative spacing between the multiple optical fibers. A ferrule can comprise a fiber optic connector itself or can be a component of a fiber optic connector.

The present disclosure also relates to a method of applying a fiber optic ferrule to an end of an optical fiber of a fiber optic cable. The method includes: providing the fiber optic cable with at least one optical fiber and a cable jacket situated around the optical fiber; removing a portion of the cable jacket from the end of the fiber optic cable to expose an end portion of the optical fiber; engaging a fixture that preferably includes a thin film with the end portion of the optical fiber to hold the end portion; substantially enclosing the end of the fiber optic cable in a mold cavity of a molding tool with the fixture locating the end portion of the optical fiber relative to the mold cavity; injecting a molding material into the mold cavity of the molding tool thereby forming at least a portion of the fiber optic ferrule; and removing the fixture from the optical fiber. The fiber optic cable can include two or more optical fibers, and the fixture can locate the end portions of the optical fibers relative to each other and relative to the molding tool. A pin or a pin assembly, secured to the ferrule, can also be located relative to the optical fibers and the molding tool by the fixture. The pin assembly can include a cable engaging feature that engages the cable jacket.

An inward facing side of the thin film can form a portion of the mold cavity when the fixture is placed within the molding tool. When the molding material is injected into the mold cavity, the molding material forms a boundary portion of the ferrule adjacent the inward facing side of the thin film. The thin film defines a film thickness that controls how far the end portions of the optical fibers extend beyond the boundary portion of the ferrule. The end portions of the optical fibers typically extend beyond the ferrule by a protruding length that is approximately equal to the film thickness. The thin film is preferably removed after injecting the molding material, and the end portions of the optical fibers are left extending beyond the boundary portion of the ferrule as fiber protrusions.

A radial locator can hold and position the optical fibers and/or the pin prior to engaging the fixture with the end portions of the optical fibers and/or an end portion of the pin. The radial locator can include static features for positioning the optical fibers and/or the pin. Alternatively, the radial locator can include dynamic features which dynamically position the optical fibers and/or the pin. The radial locator including the dynamic positioning features can use a control system with feedback to position the optical fibers and/or the pin. The control system can include a video measuring system to determine the position of the optical fibers and/or the pin.

The thin film of the fixture can initially be non-rigid when engaging the end portions of the optical fibers and/or the pin. The thin film can be hardened and/or cured after engaging the end portions of the optical fibers and/or the pin. By hardening the thin film, the optical fiber and/or the pin locations established by the radial locator can be maintained and preserved after the radial locator is removed. The thin film can thereby hold and maintain the locations of the optical fibers and/or the pin (established by the radial locator) while the end of the fiber optic cable is substantially enclosed in the mold cavity of the molding tool. After the molding material is injected into the mold cavity and hardens, the hardened molding material holds and maintains the optical fiber and/or the pin locations initially established by the radial locator. After the hardened molding material has hardened, the thin film can be removed from the molding material.

The optical fibers of the present disclosure are preferably trimmed by a laser prior to engaging their end portions with the fixture. In certain embodiments, subsequent polishing of the ends of the optical fibers can be avoided by laser trimming.

BRIEF DESCRIPTION OF THE DRAWINGS

FIG. 4A is a perspective view of an example pin assembly including two pins and a cable jacket engaging feature;

FIG. 4B is a perspective view of another example pin assembly including two pins, a cable jacket engaging feature, and mold cavity engaging features;

FIG. 5 is a perspective view of the example pin assembly of FIG. 4A adjacent the trimmed end of the optical fibers of the example fiber optic cable of FIG. 3;

FIG. 6 is a perspective view of the cable jacket engaging feature of the example pin assembly of FIG. 4A positioned over the cable jacket near the trimmed end of the optical fibers of the example fiber optic cable of FIG. 3 thus creating an example cable and pin pre-assembly;

FIG. 7 is a perspective view of the example cable and pin pre-assembly of FIG. 6 adjacent a first part of an optical fiber and pin locator;

FIG. 8 is a perspective view of the example cable and pin pre-assembly of FIG. 6 engaged with the first part of the optical fiber and pin locator of FIG. 7;

FIG. 9 is an enlarged partial elevation view of the example cable and pin pre-assembly of FIG. 6 engaged with the first part of the optical fiber and pin locator of FIG. 7;

DETAILED DESCRIPTION

The present disclosure relates to a fiber optic ferrule molded over an end of an optical fiber of a fiber optic cable.

In preferred embodiments of the present disclosure, optical fibers of the fiber optic cable are positioned with precision within the molded fiber optic ferrule. In preferred embodiments, the optical fibers protrude beyond an end of the molded fiber optic ferrule by a protruding length. The protruding length is established with precision. In preferred embodiments, locating pins/sleeves are also located with precision and molded into the molded fiber optic ferrule. In preferred embodiments, a fixture is applied to the optical fibers and/or the locating pins/sleeves before molding. The fixture is preferably inserted into a mold cavity along with the end of the fiber optic cable and the locating pins/sleeves. The fixture can aid in precisely locating the optical fibers and/or the locating pins/sleeves relative to each other and/or relative to the molded fiber optic ferrule. The fixture can further aid in precisely establishing the protruding length of the optical fibers. In preferred embodiments, the fixture includes a thin film.

Figure 22:
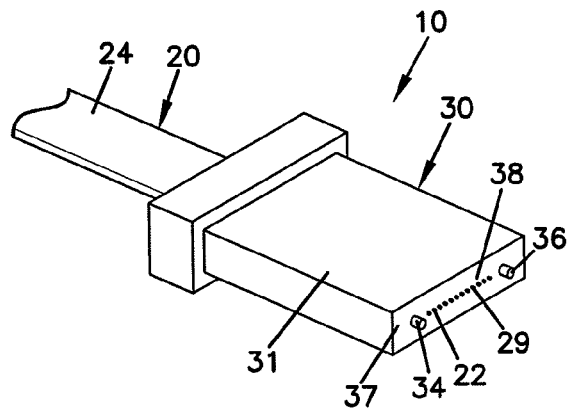
FIG. 22 is a perspective view of the molded body of FIG. 19 formed over the example pre-assembly with fixtured optical fibers and pins of FIG. 14 with the backing block and the thin film of FIG. 21 of the example optical fiber and pin fixture of FIG. 12 removed, thereby leaving the trimmed ends of the optical fibers of the example fiber optic cable of FIG. 3 extending beyond the molded body of FIG. 19 as fiber protrusions.

The present disclosure also relates to a method of applying/molding the fiber optic ferrule to the fiber optic cable. A sequence of an example method is illustrated sequentially in the figures beginning with an example fiber optic cable 20 shown at FIG. 1 and ending with an example terminated fiber optic cable assembly 10, ready for use, shown at FIG. 22.

Figure 1:
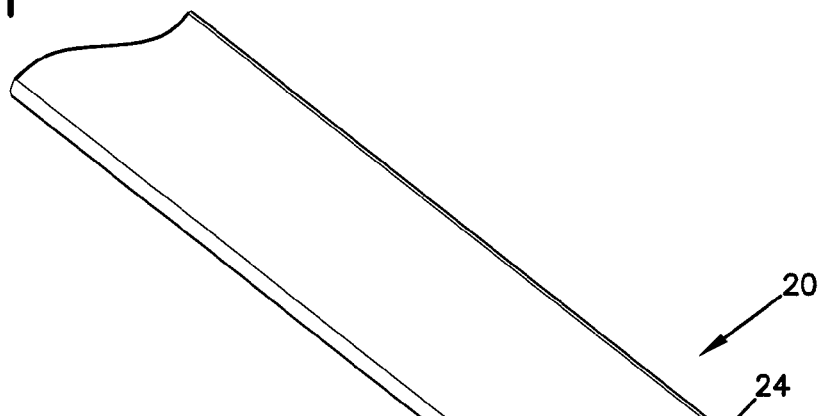
FIG. 1 is a perspective view of an example fiber optic cable, the depicted example fiber optic cable being a multi-fiber ribbon cable including multiple optical fibers, a buffer layer over each of the optical fibers, and a cable jacket over the buffer layers.
Figure 2:
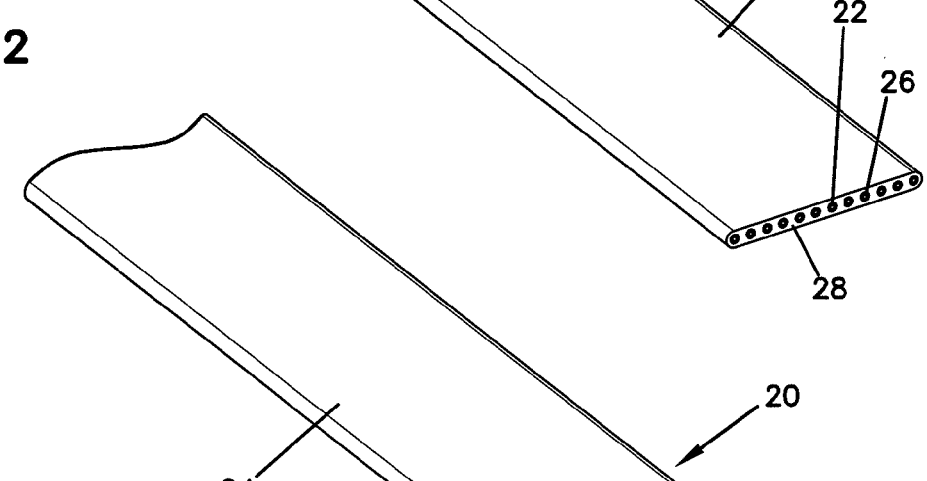
FIG. 2 is a perspective view of the example fiber optic cable of FIG. 1 with a portion of the cable jacket removed from an end of the example fiber optic cable exposing the buffer layers and a portion of the exposed buffer layers removed exposing the optical fibers.
Figure 3:
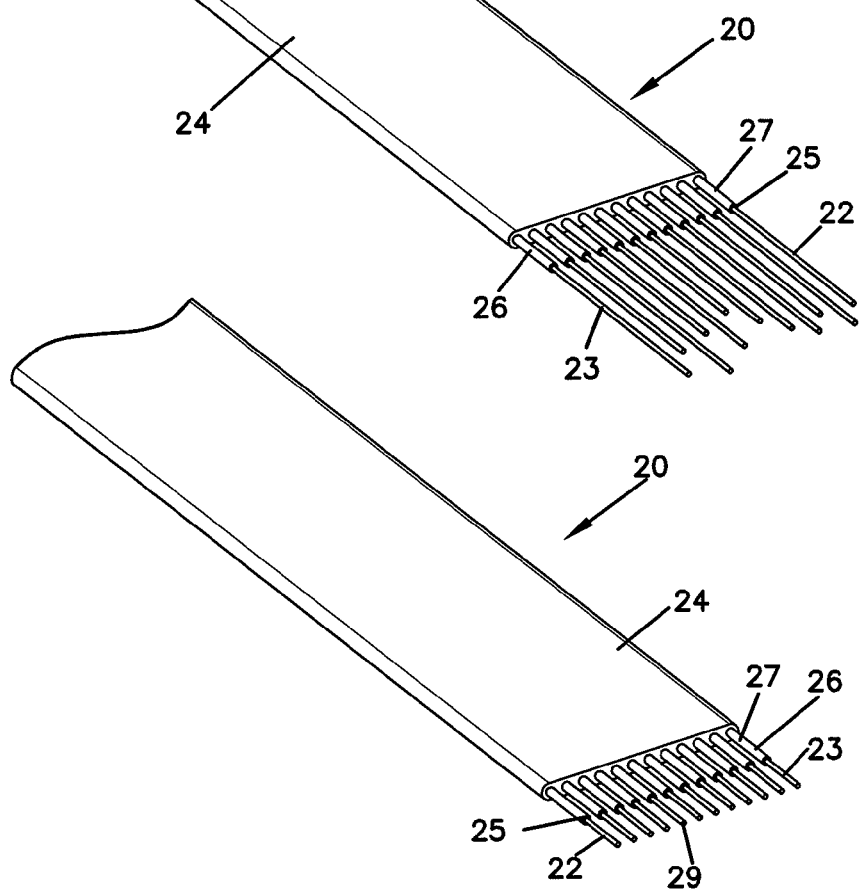
FIG. 3 is a perspective view of the example fiber optic cable of FIG. 2 with each of the exposed optical fibers trimmed thus creating a trimmed end of the optical fibers.
Figure 10:
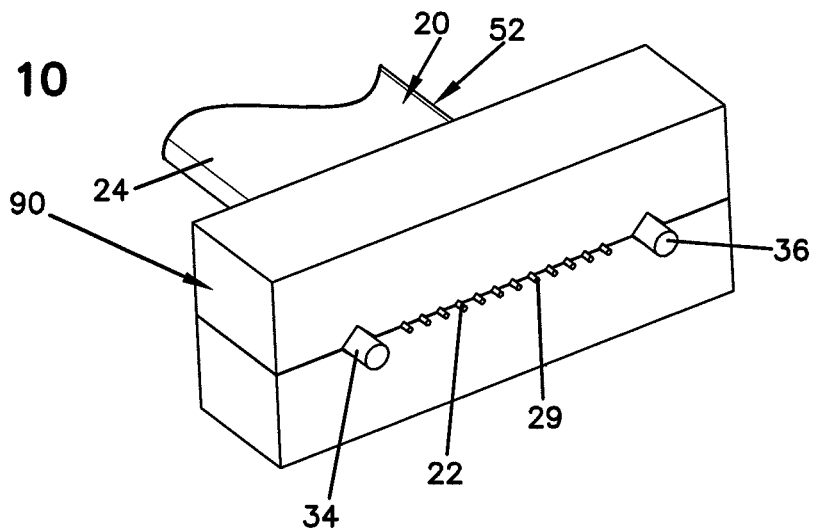
FIG. 10 is a perspective view of the example cable and pin pre-assembly of FIG. 6 engaged with the first part and a second part of the optical fiber and pin locator of FIG. 7 thus creating an example pre-assembly with located optical fibers and pins.
Figure 11:
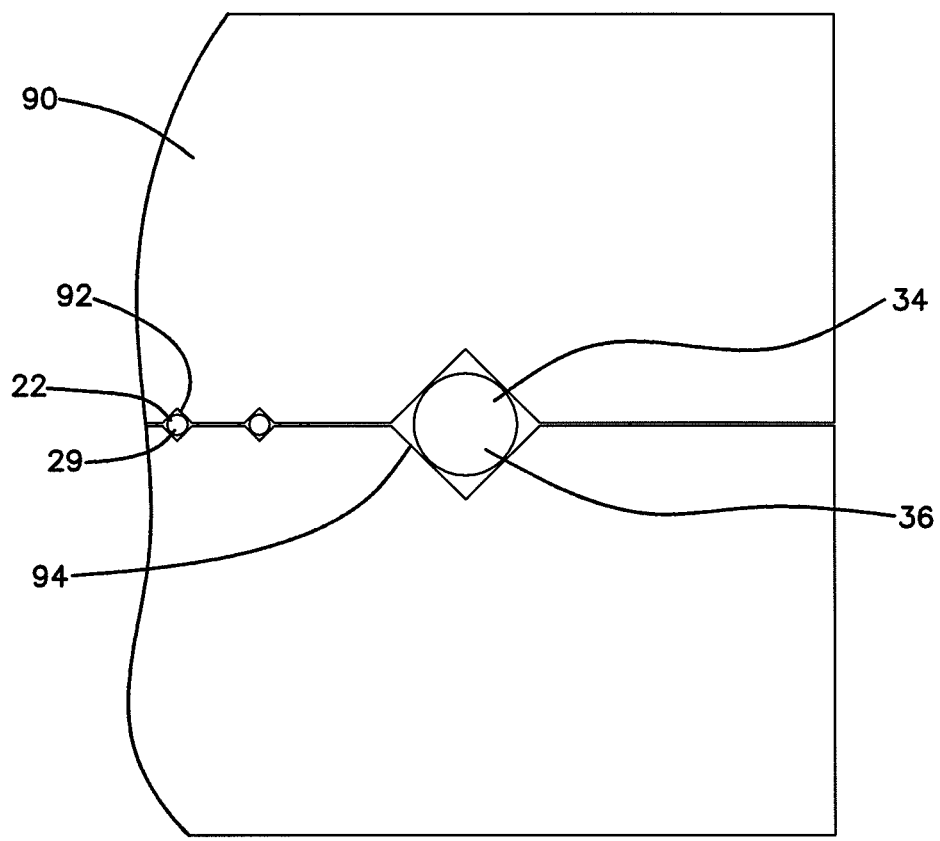
FIG. 11 is an enlarged partial elevation view of the example pre-assembly with located optical fibers and pins of FIG. 10.

In particular, FIG. 1 illustrates the example fiber optic cable 20, depicted as a multi-fiber ribbon cable including multiple optical fibers 22, a buffer layer 26 over each of the optical fibers 22, and a cable jacket 24 over the buffer layers 26. In certain embodiments, the optical fibers 22 are spaced from each other with a pitch of about 250 microns. In certain embodiments, the buffer layers 26 have an outer diameter of about 250 microns. FIG. 2 illustrates a portion of the cable jacket 24 having been removed from an end 28 of the example fiber optic cable 20 thereby exposing an exposed buffer layer length 27 of the buffer layers 26, and a portion of the buffer layers 26 having been removed thereby exposing an exposed length 23 of the optical fibers 22. Removing the portion of the buffer layers 26 creates a trimmed end 25 of the exposed buffer layer length 27. FIG. 3 illustrates the example fiber optic cable 20 further prepared with each of the optical fibers 22 having been trimmed thus creating a trimmed end 29 of the exposed lengths 23 of the optical fibers 22.

A preferred method of trimming the optical fibers 22 includes using a laser as a trimming/cutting tool. By using the laser to trim the optical fibers 22, the trimmed end 29 can be trimmed with high precision resulting in a uniform length of the trimmed optical fibers 22. Furthermore, the trimmed ends 29 can have excellent surface quality after laser trimming thus eliminating the need for polishing the trimmed ends 29. The trimmed ends 29 can be trimmed generally perpendicular to the cable 20 or can be trimmed at an angle. In certain embodiments, the trimmed ends 29 are trimmed to a plane having an angle between 81 degrees and 83 degrees with a plane including longitudinal axes of the optical fibers 22.

FIGS. 4A and 4B illustrate an example pin assembly 32 including two pins 34 and a cable jacket engaging feature 40. FIG. 4B further illustrates the example pin assembly 32 with mold cavity engaging features 42. The pins 34 are illustrated as having a filled round cross-sectional shape. Other cross-sectional shapes (e.g., square, rectangular, U-shaped, O-shaped, etc.) can alternatively be used. The pins 32 are illustrated as male pins thus resulting in the example terminated fiber optic cable assembly 10 having a male form. A female shaped pin (e.g., a sleeve) can alternatively be used thus resulting in an example terminated fiber optic cable assembly having a female form. In other embodiments, a single pin may be used or alignment structures other than pins may be used.

FIGS. 5 and 6 illustrate the example pin assembly 32 being mounted on the fiber optic cable 20 adjacent the trimmed ends 29 of the optical fibers 22. In particular, the cable engaging feature 40 of the pin assembly 32 is slid over the exposed lengths 23 of the optical fibers 22 and onto the cable jacket 24. The cable engaging feature 40 preferably engages the cable jacket 24 thus positioning the pin assembly 32 about the fiber optic cable 20 and forming an example cable and pin pre-assembly 52. In preferred embodiments, the pins 34 of the pin assembly 32 are generally parallel with the optical fibers 22 of the fiber optic cable 20 upon installation of the pin assembly 32 on the fiber optic cable 20. In preferred embodiments, the longitudinal axes of the optical fibers 22 are coplanar with longitudinal axes of the pins 34.

FIGS. 7-11 illustrate applying and engaging a locator 90 to engage and locate the exposed lengths 23 and the trimmed ends 29 of the optical fibers 22 and the pins 34 of the pin assembly 32. The depicted locator 90 includes a plurality of fiber engaging features 92 and pin engaging features 94. In the depicted embodiment, the locator 90 includes an upper half and a lower half, and the fiber and pin engaging features 92, 94 include V-groves that radially position the optical fibers 22 and the pins 34 about their respective longitudinal axes. In other embodiments, other geometry can be used to locate the optical fibers 22 and/or the pins 34. The fiber engaging features 92 of the locator 90 preferably engage the exposed lengths 23 of the optical fibers 22. In the depicted embodiment, the fiber and pin engaging features 92, 94 are fixed and static with respect to the locator 90. In other embodiments, moveable components of a locator can be used to dynamically and actively locate the optical fibers 22 and/or the pins 34. In such dynamic fiber locators, a feedback control system can be used to adjust the position of the optical fibers 22 and/or the pins 34. The feedback control system can employ a video imaging system or a light and photo detector system to monitor actual positions of the optical fibers 22 and/or the pins 34. In certain embodiments, the exposed lengths 23 of the optical fibers 22 are spaced from each other at a uniform pitch (e.g., a pitch of 250 microns) with high precision by the locator 90. The trimmed ends 29 of the optical fibers 22 are also thereby spaced from each other at the high precision pitch of 250 microns.

Figure 12:
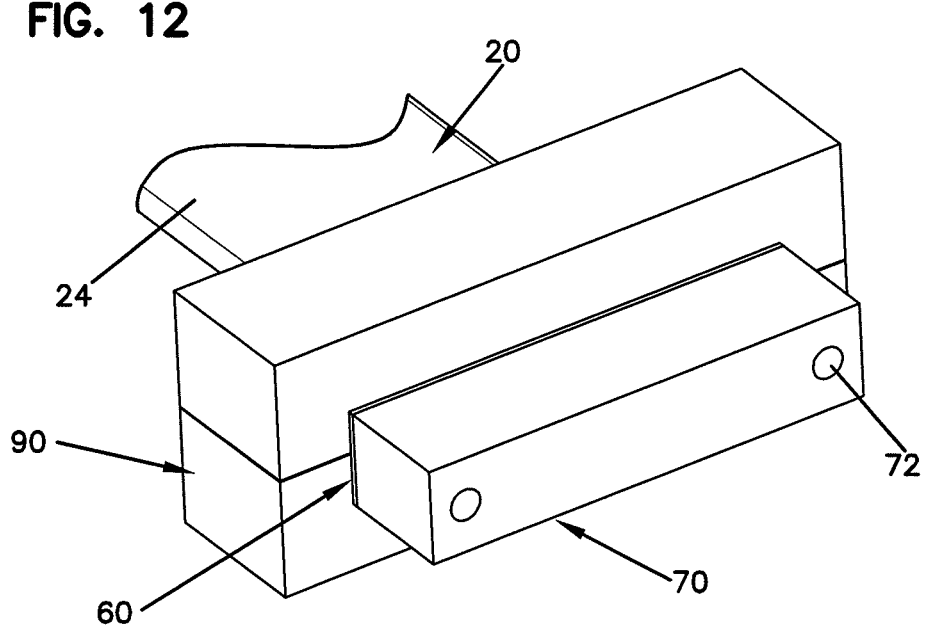
FIG. 12 is a perspective view of an example optical fiber and pin fixture mounted on the trimmed ends of the optical fibers and the two pins of the example pre-assembly with located optical fibers and pins of FIG. 10 thus creating an example pre-assembly with located and fixtured optical fibers and pins.
Figure 13:
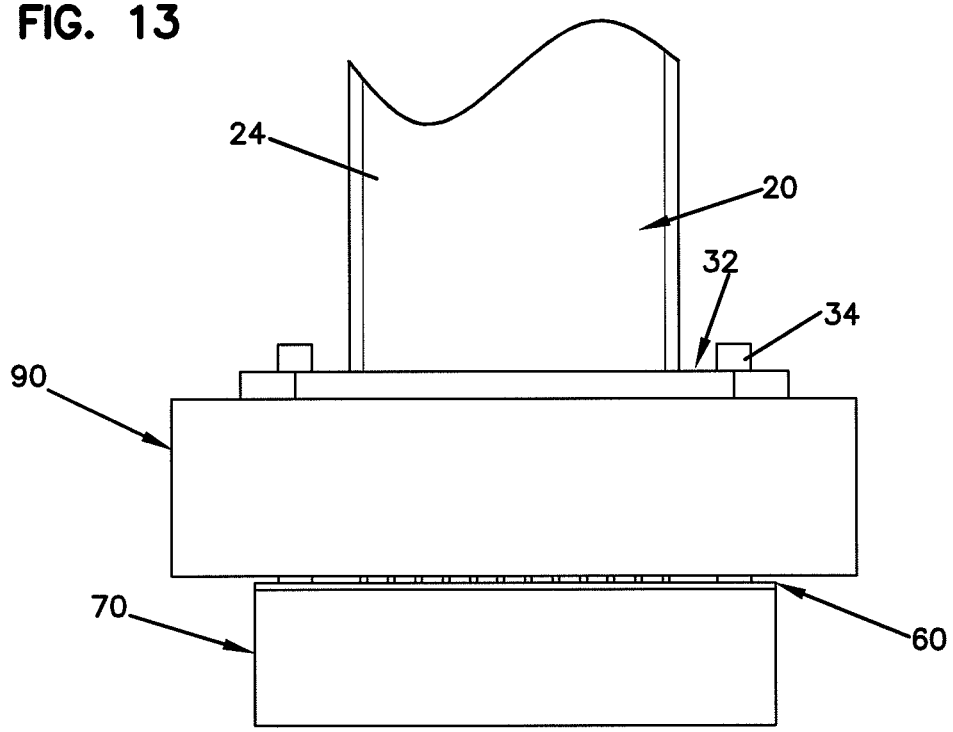
FIG. 13 is a top plan view of the example pre-assembly with located and fixtured optical fibers and pins of FIG. 12.
Figure 15:
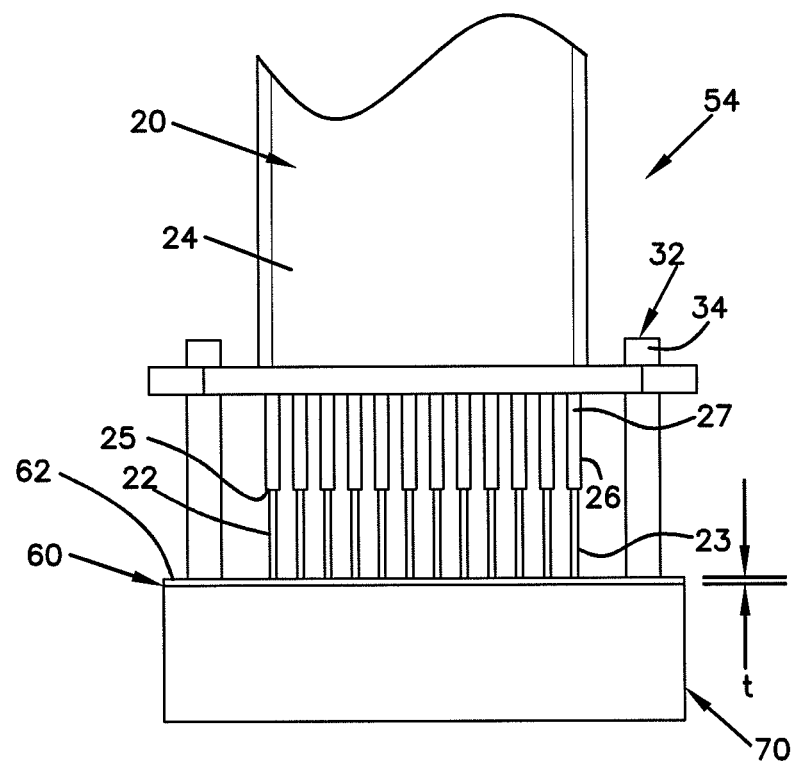
FIG. 15 is a top plan view of the example pre-assembly with fixtured optical fibers and pins of FIG. 14.
Figure 21:
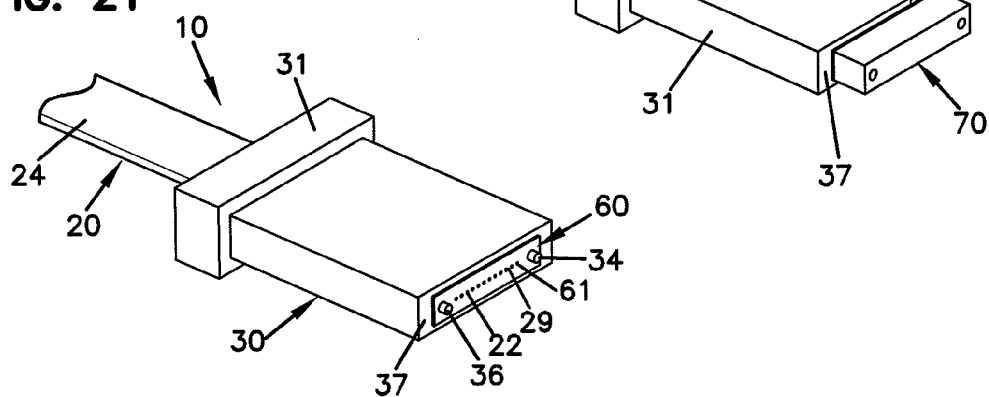
FIG. 21 is a perspective view of the molded body of FIG. 19 formed over the example pre-assembly with fixtured optical fibers and pins of FIG. 14 with a backing block of the example optical fiber and pin fixture of FIG. 12 removed and a thin film of the fixture remaining on the molded body.

FIGS. 12 and 13 illustrate applying an example optical fiber and pin fixture 60 to hold the optical fibers 22 and the pins 34 fixed with respect to each other after the locator 90 has established their positions. A fixture applicator 70 (e.g., a backing block) can additionally be used in conjunction with the fixture 60. In preferred embodiments, the fixture 60 is a thin film with a thickness t of less than 100 nanometers as illustrated at FIG. 15 with an exaggerated scale. In other embodiments, the thickness t can be other thicknesses. The fixture 60 is preferably applied to the fixture applicator 70 as the thin film in an unhardened condition. The fixture 60 can adhesively bond with the fixture applicator 70 upon contact. A first side 61 (see FIG. 21) of the fixture 60 preferably contacts and becomes co-planar with the fixture applicator 70 at a reference plane, and a second side 62 (see FIG. 15) of the fixture 60 faces away from the fixture applicator 70.

After the fixture 60 has been applied to the applicator 70, the second side 62 of the fixture 60 is brought into contact with the trimmed ends 29 of the optical fibers 22 while the optical fibers 22 are maintained/held at the desired relative spacing by the locator 90. As the fixture 60 is currently unhardened, the trimmed ends 29 can penetrate the thickness t of the fixture 60 and contact the reference plane of the fixture applicator 70. The trimmed ends 29 can adhesively bond with the fixture 60. By the reference plane of the fixture applicator 70 contacting the trimmed ends 29, the fixture applicator 70 can longitudinally position the optical fibers 22 and place all the trimmed ends 29 co-planar to each other at the reference plane of the fixture applicator 70.

The fixture applicator 70 can include bores 72 that align with the pins 34 of the pin assembly 32. Ends 36 of the pins 34 can break through the unhardened fixture 60, and the pins 34 can engage the bores 72 of the fixture applicator 70 when the fixture 60 is brought into contact with the trimmed ends 29 of the optical fibers 22. The engagement between the bores 72 of the fixture applicator 70 and the pins 34 of the pin assembly 32 of the cable and pin pre-assembly 52 orients the fixture 60 and the fixture applicator 70 with respect to the cable 20, the pins 34, and the optical fibers 22. As the orientation is held by the engagement of the pins 34 and the bores 72, and the longitudinal position is held by the trimmed ends 29 contacting the reference plane of the fixture applicator 70, the fixture applicator 70 itself is a fixture.

In embodiments with the angled trimmed ends 29, the fixture 60 and/or the fixture applicator 70 can match the angle of the trimmed ends 29. This can result in the fixture 60 and/or the fixture applicator 70 having a wedged shape or other shape.

Upon the fixture 60 and the fixture applicator 70 being positioned on and engaged with the pins 34 and the optical fibers 22 and being positioned relative to the locator 90, the fixture 60 is hardened. Various methods can be used to harden the fixture 60 including ultraviolet radiation, heat, and/or chemical reactions. By hardening the fixture 60, the high precision positions of the pins 34 and the optical fibers 22, established by the locator 90, can be preserved after the removal of the locator 90. In addition, the film thickness t of the fixture 60 can be maintained under various loads, including molding loads.

Figure 14:
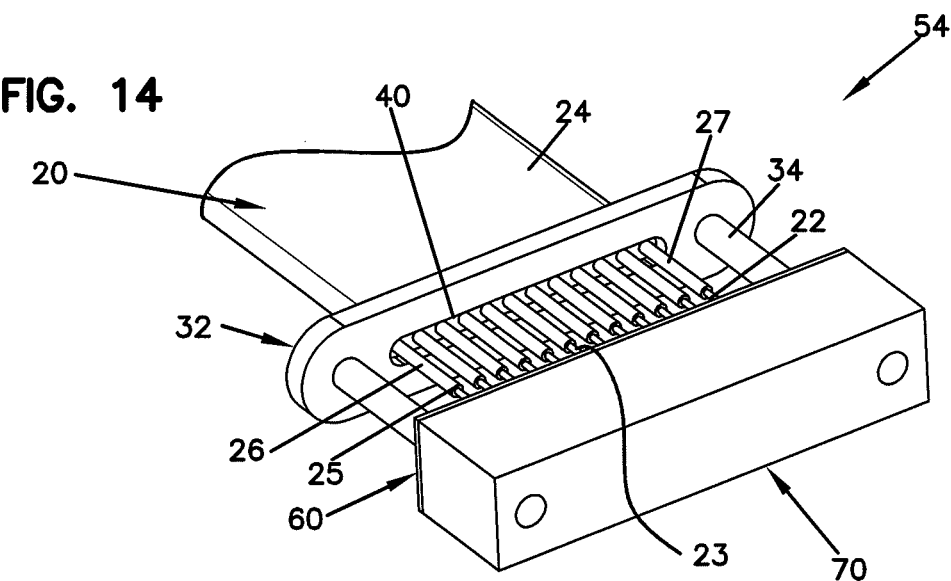
FIG. 14 is a perspective view of the example pre-assembly with located and fixtured optical fibers and pins of FIG. 12 with the first and the second parts of optical fiber and pin locator of FIG. 7 removed thus creating an example pre-assembly with fixtured optical fibers and pins.
Figure 16A:
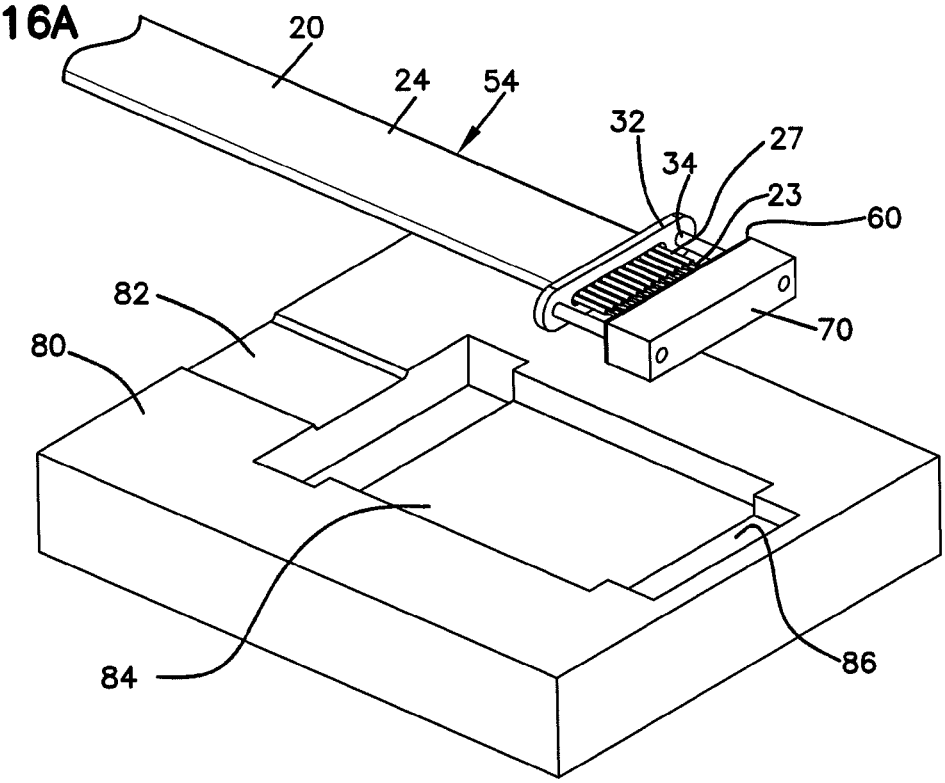
FIG. 16A is a perspective view of the example pre-assembly with fixtured optical fibers and pins of FIG. 14 adjacent a cavity of a first part of a mold tool.

Upon the hardening of the fixture 60, the locator 90 can be removed as illustrated at FIGS. 14 and 15 thereby creating an example pre-assembly 54 with fixtured optical fibers 22 and pins 34. FIGS. 16 through 18 illustrate the example pre-assembly 54 being installed in a mold cavity 84 of a molding tool 80. The molding tool 80 can include a cable jacket engaging feature 82 adapted to engage and seal with the cable jacket 24. The molding tool 80 preferably includes a pocket 86 for holding and locating the fixture 60 and the fixture applicator 70. In preferred embodiments, the mold cavity 84 substantially defines an exterior shape of a ferrule body 31. As the molding tool 80 holds and locates the fixture 60, and thereby holds and locates the pins 34 and the trimmed ends 29 of the optical fibers 22, a high locational precision can be obtained between the ferrule body 31, the pins 34, and the optical fibers 22.

Figure 16B:
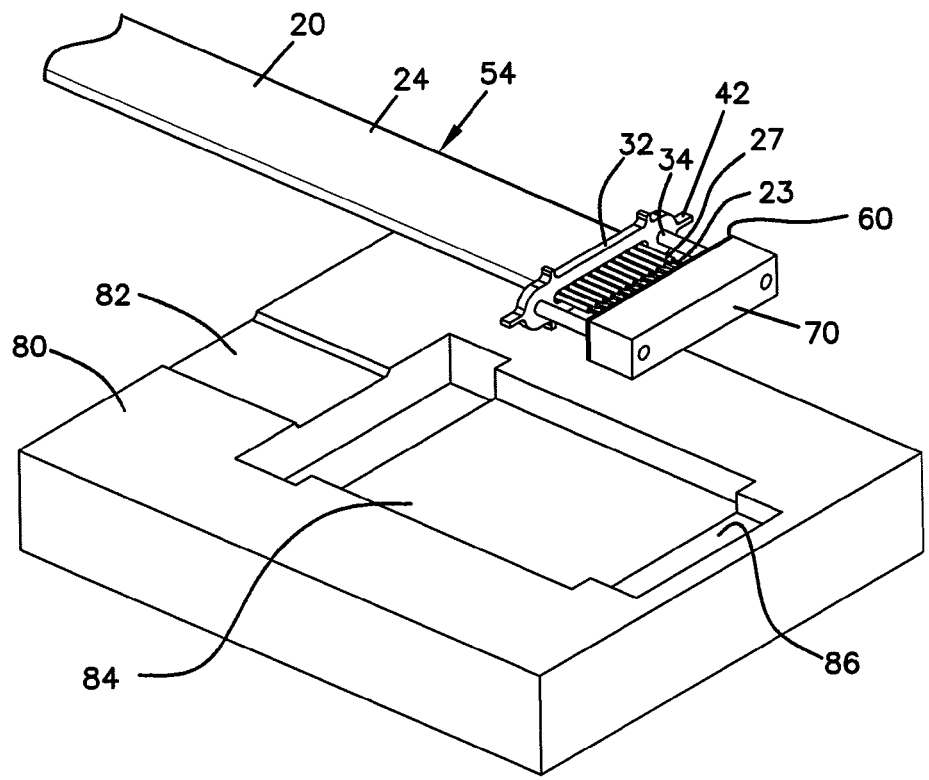
FIG. 16B is a perspective view of the example pre-assembly with fixtured optical fibers and pins of FIG. 14 adjacent the cavity of the first part of the mold tool of FIG. 16A, wherein the example pin assembly of FIG. 4B has replaced the example pin assembly of FIG. 4A.
Figure 17A:
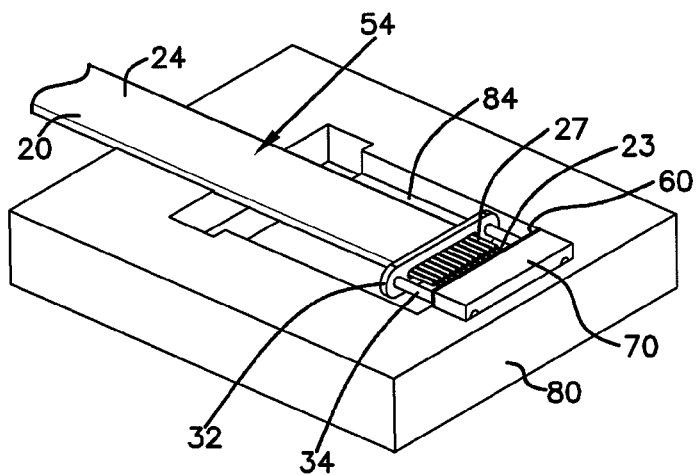
FIG. 17A is a perspective view of the example pre-assembly with fixtured optical fibers and pins of FIG. 14 installed in the cavity of the first part of the mold tool of FIG. 16A.
Figure 17B:
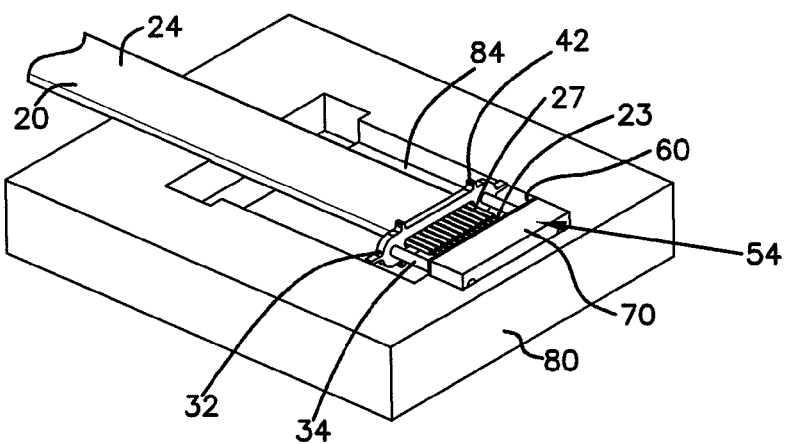
FIG. 17B is a perspective view of the example pre-assembly with fixtured optical fibers and pins of FIG. 14 installed in the cavity of the first part of the mold tool of FIG. 16A, wherein the example pin assembly of FIG. 4B has replaced the example pin assembly of FIG. 4A.
Figure 18:
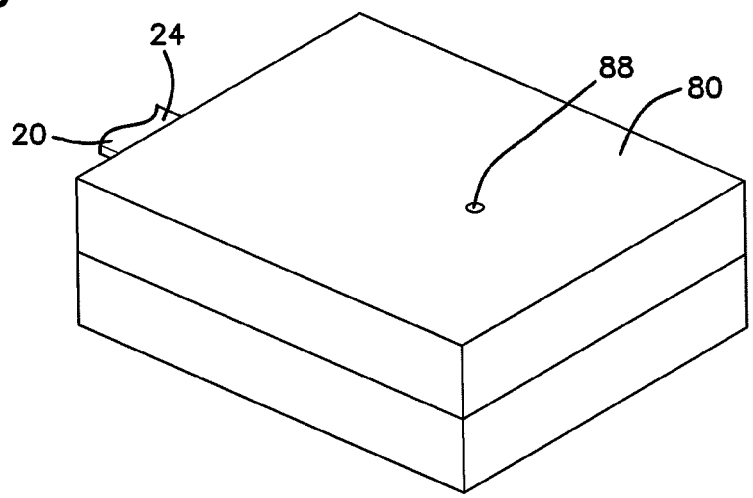
FIG. 18 is a perspective view illustrating the example pre-assembly with fixtured optical fibers and pins of FIG. 14 installed in the cavity of the first part and a cavity (hidden) of a second part of the mold tool of FIG. 16A, the cavities of the first and the second parts forming a mold cavity (hidden) substantially around the end of the example fiber optic cable of FIG. 3.

FIGS. 16B and 17B further illustrate the mold cavity engaging features 42 of the example pin assembly 32 engaging the mold cavity 84 and thereby locating the example pre-assembly 54 relative to the mold cavity 84.

Upon the example pre-assembly 54 being installed in the mold cavity 84, the mold cavity can be filled with a fluid molding material. The ferrule body 31 is formed within the mold cavity 84 as the molding material fills the mold cavity 84. The molding material can form tightly against the exposed lengths 23 of the optical fibers 22. The molding material can also form tightly against the exposed lengths 27 of the buffer layer 26. In certain embodiments, the mold cavity 84 can be a closed mold cavity as illustrated at FIGS. 16A through 18. The molding material can be injected into the mold cavity 84 through one or more injection ports 88 of the molding tool 80. In preferred embodiments, a low pressure and/or low velocity injection process is employed to minimize molding material loading on the optical fibers 22 and the fiber optic cable 20. In other embodiments, an open mold cavity can be used and/or a gravity feed can be used to fill the mold cavity with the molding material. The molding material is preferably a thermoplastic, a thermoset plastic, or a filled thermoplastic material.

The second side 62 of the fixture 60 inwardly faces the mold cavity and preferably forms a portion of the mold cavity 84, and the fixture 60 and the fixture applicator 70 thereby form a part of the molding tool 80. The portion of the mold cavity 84 formed by the second side 62 of the fixture 60 is adjacent an end 37 of the ferrule body 31. An area 38 (i.e., a boundary portion) of the end 37 of the ferrule body 31 is thereby molded against the second side 62 of the fixture 60.

As the trimmed ends 29 of the optical fibers 22 penetrated the fixture 60 before the fixture 60 was hardened, the trimmed ends 29 extend beyond the mold cavity 84 by a protruding length that is equal to, very nearly equal to, or approximately equal to the thickness t of the fixture 60.

Figure 19:
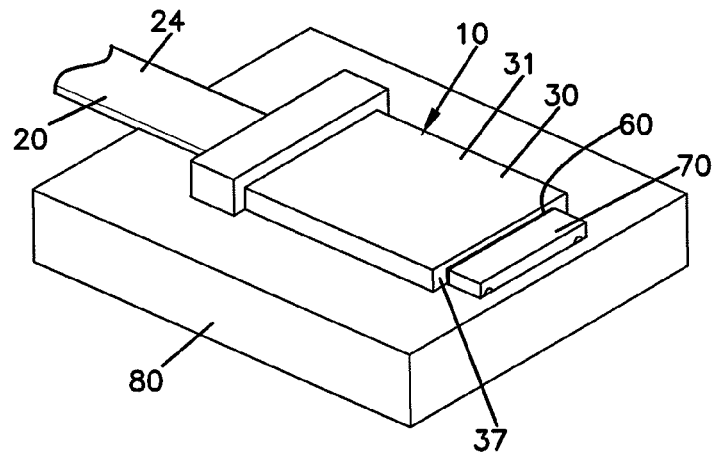
FIG. 19 is a perspective view of the example pre-assembly with fixtured optical fibers and pins of FIG. 14 after a molding material has been injected into the mold cavity of FIG. 18 and the second part of FIG. 18 of the mold tool of FIG. 16A has been removed, the injected molding material having formed a molded body over a portion of the example fixtured pre-assembly of FIG. 14.
Figure 20:
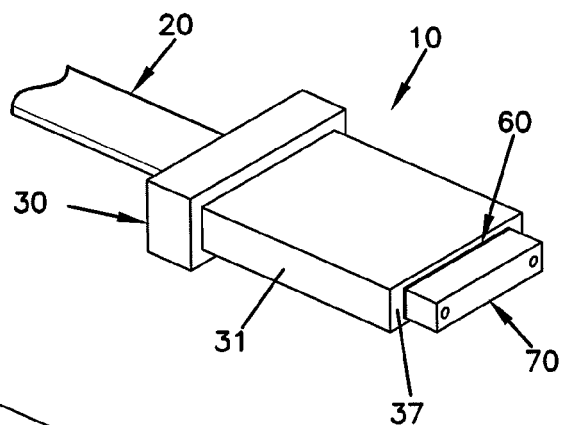
FIG. 20 is a perspective view of the molded body of FIG. 19 formed over the example pre-assembly with fixtured optical fibers and pins of FIG. 14 after the first part of the mold tool of FIG. 16A and the second part of FIG. 18 of the mold tool have been removed.

Upon the mold cavity 84 being filled with the molding material, the molding material is cured/hardened. The molding material can be cured by various methods such as heating, cooling, chemical reactions, photo-chemical reactions, etc. Upon hardening of the molding material, the molding tool 80 is opened (see FIG. 19) and the hardened ferrule body 31 is removed from the molding tool 80. Preferably, the fixture 60 and the fixture applicator 70 are removed from the mold tool 80 with the ferrule body 31 (see FIG. 20).

Upon the removal of the ferrule body 31, the fixture 60, and the fixture applicator 70 from the molding tool 80, the fixture applicator 70 and the fixture 60 are removed from the ferrule body 31 either in sequence (see FIGS. 21 and 22) or at the same time. The ends 36 of the pins 34 and the trimmed ends 29 of the optical fibers 22 protrude beyond the area 38 of the end 37 of the ferrule body 31. The hardened ferrule body 31 maintains the precise locations of the pins 34 and the protruding trimmed ends 29 of the optical fibers 22.

In the depicted example embodiments, the mold tool 80 is removed from a ferrule terminated cable assembly 30. In other embodiments, a mold tool can be a shell and become an outer case of a fiber optic ferrule. In this embodiment, the molding material is injected into the shell and fills voids in the shell. After the molding material has been injected, the shell remains as part of the fiber optic ferrule. In certain embodiments, the shell forms a portion of a mold cavity, the second side 62 of the fixture 60 forms another portion of the mold cavity, and other mold tooling can form yet another portion of the mold cavity.

Example embodiments in the figures illustrate multi-termination ferrules. Such multi-termination ferrules generally have a rectangular configuration, and example multi-termination adapters generally include rectangular multi-termination ferrule receptacles for accommodating the multi-termination ferrules. The multi-termination ferrules can have a single row of optical fibers as included in the embodiments illustrated in the figures. Other embodiments of the multi-termination ferrules can include multiple rows of optical fibers or optical fibers not arranged in rows. Other embodiments of the present disclosure include ferrules with a single optical fiber.

In the present disclosure, example fiber optic cables including buffer layers are discussed and illustrated. Fiber optic cables including one or more optical fibers not within a buffer layer can also be terminated according to the present disclosure. Likewise, example fiber optic cables including a cable jacket are discussed and illustrated. A collection of optical fibers not within a cable jacket can also be terminated according to the present disclosure.

In the present disclosure, the term "generally parallel" includes items and variations that are approximately parallel and actually parallel. Likewise, the term "generally perpendicular" includes items and variations that are approximately perpendicular and actually perpendicular. Other uses of the terms "generally" and "general" (e.g., generally aligns, generally rectangular) also include the actual form, forms with slight variations, and forms substantially including the specified characteristic.

From the forgoing detailed description, it will be evident that modifications and variations can be made in the devices and methods of the disclosure without departing from the spirit or scope of the invention.

What is claimed is:

1. A method of applying a fiber optic ferrule, the method comprising:
   providing a fiber optic cable, the fiber optic cable including at least one optical fiber and a cable jacket situated around the at least one optical fiber;
   removing a portion of the cable jacket from an end of the fiber optic cable thereby exposing an end portion of the at least one optical fiber;
   engaging a fixture with the end portion of the at least one optical fiber and thereby holding the end portion with the fixture, the fixture including a thin film that engages and holds the end portion of the at least one optical fiber;
   substantially enclosing the end of the fiber optic cable in a mold cavity, the mold cavity positioned within and at least partially defined by a molding tool, the fixture locating the end portion of the at least one optical fiber relative to the mold cavity of the molding tool;
   injecting a molding material into the molding tool thereby forming at least a portion of the fiber optic ferrule; and
   removing the fixture from the end portion of the at least one optical fiber;
   wherein the thin film of the fixture is a non-rigid hardenable film before engagement with the end portion of the at least one optical fiber.

2. The method of claim 1, wherein the fiber optic cable includes at least two of the optical fibers, the fixture locating the end portions of the at least two optical fibers relative to each other and relative to the molding tool.

3. The method of claim 2, further comprising providing a pin assembly including at least one pin, engaging the fixture with an end portion of the at least one pin, and enclosing at least a portion of the pin assembly in the molding tool, the fixture locating the end portion of the at least one pin relative to the molding tool and relative to the end portions of the at least two optical fibers.

4. The method of claim 3, wherein the pin assembly includes at least two of the pins.

5. The method of claim 3, wherein the pin assembly further includes a cable engaging feature, the cable engaging feature engaging the cable jacket of the fiber optic cable.

6. The method of claim 2, wherein an inward facing side of the thin film forms a portion of the mold cavity within the molding tool, wherein the molding material forms a boundary portion of the fiber optic ferrule adjacent the inward facing side of the thin film, wherein a film thickness of the thin film controls a protruding length that the end portions of the optical fibers extend beyond the boundary portion of the fiber optic ferrule, and wherein when the thin film is removed after injecting the molding material the end portions of the optical fibers are left extending beyond the boundary portion of the fiber optic ferrule as fiber protrusions, the fiber protrusions extending beyond the fiber optic ferrule by the protruding length.

7. The method of claim 3, wherein removing the portion of the cable jacket from the end of the fiber optic cable exposes a length of the at least two optical fibers, the method further comprising engaging a radial locator with the at least two optical fibers along the exposed lengths of the optical fibers and engaging the radial locator along a length of the at least one pin thereby radially locating and aligning the at least two optical fibers and the at least one pin.

8. The method of claim 7, wherein the radial locator is engaged with the exposed lengths of the optical fibers and with the length of the at least one pin before the fixture is engaged with the end portions of the optical fibers and the at least one pin, wherein the radial locator is disengaged and removed after the fixture is engaged with the end portions of the optical fibers and the at least one pin, and wherein the radial locator is removed before substantially enclosing the end of the fiber optic cable in the molding tool.

9. The method of claim 8, wherein fiber and pin engaging features of the radial locator are statically positioned.

10. The method of claim 8, wherein at least some fiber and pin engaging features of the radial locator are dynamically positioned.

11. The method of claim 8, wherein the thin film of the fixture is non-rigid before engagement with the at least one pin, the method further comprising hardening the hardenable film before the radial locator is removed from along the lengths of the optical fibers and the at least one pin.

12. The method of claim 11, wherein the end portions of the optical fibers at least partially penetrate the hardenable film and the at least one pin fully penetrates the hardenable film when the hardenable film is engaged with the end portions of the optical fibers and the end portion of the at least one pin.

13. The method of claim 12, wherein an inward facing side of the hardenable film forms a portion of the mold cavity within the molding tool, wherein the molding material forms a boundary portion of the fiber optic ferrule adjacent the inward facing side of the hardenable film, wherein a film thickness of the hardenable film controls a protruding length that the end portions of the optical fibers extend beyond the boundary portion of the fiber optic ferrule, and wherein the hardenable film is removed after injecting the molding material thereby leaving the end portions of the optical fibers that extend beyond the boundary portion of the fiber optic ferrule as fiber protrusions.

14. A method of installing optical fibers in an optical ferrule, the method comprising:
   connecting a fixture to end portions adjoining end faces of the optical fibers to hold the optical fibers in position relative to one another, wherein the fixture is an initially non-rigid but hardenable fixture;
   molding the optical ferrule over at least a portion of the optical fibers while the fixture remains connected to the end portions of the optical fibers;
   removing the fixture from the optical fibers after the optical ferrule has been molded over the optical fibers;
   connecting the fixture to an end portion of at least one pin, the fixture holding the at least one pin in position relative to the optical fibers;
   molding the optical ferrule over at least a portion of the at least one pin while the fixture remains connected to the end portion of the at least one pin;
   removing the fixture from the at least one pin after the optical ferrule has been molded over the optical fibers;
   connecting a radial locator to a portion of the optical fibers and to a portion of the at least one pin to locate the optical fibers and the at least one pin relative to one another before the fixture is connected to the end portions of the optical fibers and the end portion of the at least one pin; and
   hardening the hardenable fixture and then removing the radial locator from the optical fibers and the at least one pin before connection with the end portions of the optical fibers and the end portion of the at least one pin.

15. The method of claim 14, wherein a cable jacket at least partially covers the optical fibers and the optical ferrule is molded over a portion of the cable jacket.

16. A method of installing optical fibers in an optical ferrule, the method comprising:
   connecting a fixture to end portions of the optical fibers to hold the optical fibers in position relative to one another;

molding the optical ferrule over at least a portion of the optical fibers while the fixture remains connected to the end portions of the optical fibers; and removing the fixture from the optical fibers after the optical ferrule has been molded over the optical fibers;

wherein the fixture is an initially non-rigid but hardenable fixture before connection with the end portions of the optical fibers.

17. The method of claim 16, further comprising connecting a radial locator to a portion of the optical fibers to locate the optical fibers relative to one another before the fixture is connected to the end portions of the optical fibers.

18. A method of installing optical fibers in an optical ferrule, the method comprising:

trimming the optical fibers to thereby form end faces of the optical fibers and finishing surfaces of the end faces of the optical fibers prior to abutting the end faces against a fixture;

abutting the finished end faces of the optical fibers against the fixture along a longitudinal direction of the optical fibers;

connecting the fixture to end portions of the optical fibers that adjoin the end faces of the optical fibers to hold the optical fibers in position relative to one another;

molding the optical ferrule over at least a portion of the optical fibers while the fixture remains connected to the end portions of the optical fibers; and removing the fixture from the optical fibers after the optical ferrule has been molded over the optical fibers.

19. A method of installing optical fibers in an optical ferrule, the method comprising:

at least partially penetrating a film with end portions of the optical fibers and thereby connecting a fixture to the end portions of the optical fibers to hold the optical fibers in position relative to one another;

molding the optical ferrule over at least a portion of the optical fibers while the fixture remains connected to the end portions of the optical fibers; and removing the fixture from the optical fibers after the optical ferrule has been molded over the optical fibers.

20. A method of applying a fiber optic ferrule, the method comprising:

providing a fiber optic cable, the fiber optic cable including at least one optical fiber and a cable jacket situated around the at least one optical fiber;

removing a portion of the cable jacket from an end of the fiber optic cable thereby exposing an end portion of the at least one optical fiber;

engaging a fixture with the end portion of the at least one optical fiber and thereby holding the end portion with the fixture, the fixture including a thin film that engages and holds the end portion of the at least one optical fiber in at least one direction parallel to the thin film;

substantially enclosing the end of the fiber optic cable in a mold cavity, the mold cavity positioned within and at least partially defined by a molding tool, the fixture locating the end portion of the at least one optical fiber relative to the mold cavity of the molding tool;

injecting a molding material into the molding tool thereby forming at least a portion of the fiber optic ferrule; and removing the fixture from the end portion of the at least one optical fiber.

21. The method of claim 20, wherein the end portion of the at least one optical fiber at least partially penetrates the thin film.

22. The method of claim 1, further comprising hardening the hardenable film.

23. The method of claim 8, further comprising hardening the hardenable film before the radial locator is removed from along the lengths of the optical fibers and the at least one pin.

24. The method of claim 17, further comprising hardening the hardenable fixture and then removing the radial locator from the optical fibers.

* * * * *